US012790524B2

(12) United States Patent
Liu et al.

(10) Patent No.: US 12,790,524 B2
(45) Date of Patent: Nov. 10, 2026

(54) CURABLE COMPOSITIONS FOR COMPOSITE AND TOOL RELEASE

(71) Applicant: Henkel AG & Co. KGaA, Duesseldorf (DE)

(72) Inventors: Zhongwei Liu, Newington, CT (US); Christopher Verosky, Coventry, CT (US); Kevin Welch, Wallingford, CT (US); Daniel Yi, Great Neck, NY (US); Chih-Min Cheng, Westford, MA (US)

(73) Assignee: Henkel AG & Co. KGaA, Duesseldorf (DE)

( * ) Notice: Subject to any disclaimer, the term of this patent is extended or adjusted under 35 U.S.C. 154(b) by 512 days.

(21) Appl. No.: 18/560,433

(22) PCT Filed: May 3, 2022

(86) PCT No.: PCT/US2022/027436
§ 371 (c)(1),
(2) Date: Nov. 13, 2023

(87) PCT Pub. No.: WO2022/250884
PCT Pub. Date: Dec. 1, 2022

(65) Prior Publication Data

US 2024/0254374 A1 Aug. 1, 2024

Related U.S. Application Data

(60) Provisional application No. 63/192,631, filed on May 25, 2021.

(51) Int. Cl.

| | |
|---|---|
| ***C09J 163/00*** | (2006.01) |
| ***C08G 59/32*** | (2006.01) |
| ***C08G 59/50*** | (2006.01) |
| ***C08G 59/66*** | (2006.01) |
| *C09J 163/10* | (2006.01) |

(52) U.S. Cl.
CPC ............ *C09J 163/00* (2013.01); *C08G 59/32* (2013.01); *C08G 59/50* (2013.01); *C08G 59/66* (2013.01); *C09J 163/10* (2013.01)

(58) Field of Classification Search
CPC .............................. C09J 163/00; C09J 163/10
See application file for complete search history.

(56) References Cited

U.S. PATENT DOCUMENTS

| | | | | |
|---|---|---|---|---|
| 6,168,358 | B1 | 1/2001 | Engwall et al. | |
| 2010/0173069 | A1 | 7/2010 | Lu et al. | |
| 2012/0156501 | A1* | 6/2012 | Campbell | C09J 163/00 523/400 |
| 2013/0005853 | A1 | 1/2013 | Morley et al. | |
| 2016/0152819 | A1 | 6/2016 | Balijepalli et al. | |
| 2020/0087512 | A1* | 3/2020 | Chang | A43B 13/20 |
| 2022/0315813 | A1* | 10/2022 | Stapf | C08L 63/00 |

FOREIGN PATENT DOCUMENTS

| | | | |
|---|---|---|---|
| WO | 2004106026 | A1 | 12/2004 |
| WO | 2018164794 | A1 | 9/2018 |

OTHER PUBLICATIONS

International Search Report for International Patent Application No. PCT/US2022/027436, Mailing date: Aug. 10, 2022.
Evonik Industries, TEGO Nanoresins—Perfect Protection for Immaculate Beauties, 12 pages.
'Toray' Toray Advanced Composites, AmberTool, Tooling Prepreg Processing Guide, 24 pages.

* cited by examiner

*Primary Examiner* — Margaret G Moore
(74) *Attorney, Agent, or Firm* — Mary K. Cameron

(57) ABSTRACT

The present disclosure relates generally to two part adhesive compositions comprising a resin part including a curable resin selected from multifunctional, hydroxyl di-terminated polymer having alkene segments and epoxide segments in the polymer chain; an epoxy di-terminated block copolymer having siloxane moieties and bisphenol A moieties in the backbone and combination thereof and a hardener part including a curative for the curable resin. When mixed the compositions cure to a form that provides hardness but relatively low bond strength to a substrate and which can be removed from metal and other surfaces easily and simply with little residue.

11 Claims, No Drawings

CURABLE COMPOSITIONS FOR COMPOSITE AND TOOL RELEASE

FIELD

The present disclosure relates generally to two-part adhesive compositions comprising epoxy functional resins. When mixed the compositions cure to a form that provides hardness but relatively low bond strength to a substrate and which can be removed from metal and other surfaces easily and simply with little residue.

BRIEF DESCRIPTION OF RELATED TECHNOLOGY

Molding and curing composite materials into desired shapes is well known. One example is disposing layers of polyester resin saturated glass fiber reinforcing material into a mold. Once cured the article is removed from the mold. One problem is the resin will strongly bond to the mold surface, permanently bonding the cured article to the mold. To prevent this a release agent must be applied to the mold surface before layup. The resin will not bond to the release agent allowing the cured article to release from the mold. Release agent is typically applied to the mold before each use.

Molds are expensive to produce. Molds for items such as a boat hull or wind turbine blade are large and require substantial room to store and move. There is a benefit to minimizing mold inventory. One way to reduce mold inventory is to create molds that can be used to form a range of articles. For example, a mold can be produced to form a large panel. Temporarily blocking off sections of the mold allows a user to make smaller panels or larger panels or panels with holes for windows or fittings with the same mold, thereby minimizing mold inventory and cost.

Temporarily blocking off sections of a mold is difficult. The blocking material must seal to the mold to prevent molding resin movement into unwanted areas. The blocking material must be able to take on complex shapes, fill in small or finely detailed areas and remain in place on vertical portions. The blocking material must be sufficiently hard to support the composite molding materials during the layup and curing process without excessive deflection or movement even in applications using pressure or vacuum to force the uncured composite molding material into the mold. The blocking material must retain these properties at high temperatures if the mold and composite molding material is heated during curing. Paradoxically, while the blocking material must adhere to the mold, it must also be readily and almost completely removable from both the mold and cured composite article without use of special operations or tools or solvents so that the mold can be reused with little work. For this reason, it is desirable for the blocking material to have an adhesion failure mode wherein the bond strength of the cured blocking material to the mold is lower than both the strength of the mold material and lower than the strength of the cured blocking material itself. Adhesive failure provides a desirable clean separation of most or all of the cured blocking material from the surface of the mold. Paradoxically, it is desirable for the cured blocking material to have sufficient cohesive strength to be removed from the mold in substantially large pieces and ideally in one piece.

Conventional curable adhesive materials are based on polyurethane, epoxy, acrylate or other chemistries. Conventional curable adhesive materials cannot provide the properties necessary for use as a mold blocking material. For example, commercial adhesive compositions based on epoxy resins are well known for providing cured bonds having high substrate bond strengths of 2,000 psi or more. Conventional epoxy adhesives are also designed to provide a cohesive failure mode, e.g., the cured adhesive fails internally leaving cured adhesive strongly bonded to adherend surfaces. The cohesive failure mode is desirable in epoxy adhesives used in structural bonding applications as it is a reliable indicator of the ultimate load to which the cured bond can safely be used. The high strength and cohesive failure mode allows conventional epoxy adhesives to be used in structural composite materials used in high load applications such as boats and aircraft. A conventional epoxy adhesive is not suitable for use as a blocking material as it would strongly bond to the mold surface and the cohesive failure mode would make removal of the cured blocking material from the mold difficult or impossible, leading to costly reworking or making the mold unusable.

The composite molding material can also strongly bond to the cured mold blocking material, making removal of the cured part from the blocking material and mold difficult. Using mold release can help ease removal of the cured part from the mold and/or cured blocking material. However, applying mold release adds an additional labor intensive step to the molding operation. Further, the blocking material must be cured before the mold release can be applied adding unwanted complexity and time to the molding operation.

There remains a need for a curable blocking material that can satisfy most or all of the above requirements.

SUMMARY

One aspect of the disclosure provides a satisfactory two component, curable blocking material.

In one embodiment the two component, curable blocking material has a room temperature cured hardness of at least 15 Shore A and/or a heated cure hardness of at least 30 Shore A and/or a strength of no more than 800 psi.

In one embodiment the two component, curable blocking material has no material comprising a backbone with more than 15 mole % aryl moieties and preferably no more than 15 mole % bisphenol A $[(CH_3)_2C(C_6H_4OH)_2]$ moieties.

In one embodiment the two component, curable blocking material has a major amount of a polymer comprising siloxane or polybutadiene moieties in the backbone.

In other embodiments the two component, curable blocking material has some or all of the following features.

1. A curable, two component, mold blocking material, including:
   - a resin part comprising,
     - a curable resin selected from multifunctional, hydroxyl di-terminated polymer having alkene segments and epoxide segments in the polymer chain; an epoxy di-terminated block copolymer having siloxane moieties and bisphenol A moieties in the backbone and combinations thereof;
     - optionally a reactive diluent, a non-reactive diluent, a release agent, a filler, an additive or a combination thereof;
   - a hardener part comprising,
     - at least one curative;
     - optionally a non-reactive diluent, a release agent, filler, an additive or a combination thereof;
     - wherein cured reaction products of the mixed mold blocking material have an adhesion strength of less than or equal to 1,000 psi when tested using a lap shear test and the lap shear test sample exhibits at least some adhesive failure.

2. The mold blocking material of 1 wherein the resin part comprises at least one of the non-reactive diluent or the release agent;
3. The mold blocking material of 1 or 2 comprising both up to 25 wt. % release agent and up to 30 wt. % non-reactive diluent in the resin part, in each case by weight of the resin part.
4. The mold blocking material of any of 1 to 3 having no material comprising a backbone with more than 15 mole % of an aryl moiety.
5. The mold blocking material of any of 1 to 4 having no material comprising a backbone with more than 15 mole % of bisphenol A moieties.
6. The mold blocking material of any of 1 to 5 wherein non-reactive diluent is present in the resin part in an amount of up to 30 wt. % of non-reactive diluent by weight of the resin part.
7. The mold blocking material of any of 1 to 6 further comprising release agent in the resin part or the hardener part.
8. The mold blocking material of any of 1 to 7 wherein the mixed mold blocking material has an open time of 2 to 40 minutes; and/or a gel time of 1 to 30 minutes; and/or a room temperature cure time of 2 to 12 hours.
9. Cured reaction products of the mixed mold blocking material of any of 1 to 8 having a tensile strength of less than 1,000 psi.
10. Cured reaction products of the mixed mold blocking material of any of 1 to 8 having a room temperature cure hardness of greater than 10 Shore A, preferably greater than 20 Shore A.
11. Cured reaction products of the mixed mold blocking material of any of 1 to 8 having a heat cure hardness of greater than 30 Shore A, preferably in the range of 30 to 100 Shore A and more preferably in the range of 50 to 80 Shore A.
12. Use of the curable, two component, mold blocking material of any of 1 to 11 to temporarily and reversibly modify a mold.

DETAILED DESCRIPTION

The singular forms "a", "an" and "the" include plural referents unless the context clearly dictates otherwise.

About or "approximate" as used herein in connection with a numerical value refer to the numerical value ±10%, preferably ±5% and more preferably ±1% or less.

The terms "comprising", "comprises" and "comprised of" as used herein are synonymous with "including", "includes", "containing" or "contains", and are inclusive or open-ended and do not exclude additional, non-recited members, elements or method steps.

"Essentially free" is intended to mean herein that the applicable group, compound, mixture or component constitutes less than 0.1 wt. %, based on the weight of the defined composition. "Free of", as used in this context, means that the amount of the corresponding substance in the reaction mixture is less than 0.05 wt. %, preferably less than 0.01 wt. %, more preferably less than 0.001 wt. %, based on the total weight of the reaction mixture.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

Preferred and preferably are used frequently herein to refer to embodiments of the disclosure that may afford particular benefits, under certain circumstances. However, the recitation of one or more preferable or preferred embodiments does not imply that other embodiments are not useful and is not intended to exclude those other embodiments from the scope of the disclosure.

"Substantially" refers to more than 70%, preferably more than 80%, more preferably more than 90% of the recited property.

The molecular weights given in the present text refer to number average molecular weights (Mn), unless otherwise stipulated. Molecular weight data can be obtained by gel permeation chromatography (GPC) calibrated against polystyrene standards in accordance with DIN 55672-1:2007-08 at 35° C., unless otherwise stipulated. The weight average molecular weight Mw can be determined by GPC, as described for Mn.

"Cure" refers to both crosslinking and curing. "Crosslinking" is defined as the formation of chemical or physical interactions between polymer chains. The term "curing" is broader than the term "crosslinking" and includes the total polymerization process from initiation of the reaction to when the final reaction products are produced. Cure time is the time required for curing.

"Open time" refers to the period of time following adhesive application where a serviceable bond is able to be created.

As used herein a curable, one component (1K) composition is a singular formulation that has sufficient commercial stability to be prepared, warehoused and shipped to an end user as a singular formulation. The 1K composition can be used without adding any additional components and will crosslink or cure when exposed to suitable conditions, for example moisture. As used herein a two component (2K) composition has two or more components. Each of the components is prepared, warehoused and shipped separately from the other components. The components are mixed immediately prior to use. Mixing of the components starts a cure reaction so commercial storage after mixing is not possible.

"Epoxide compound" denotes monoepoxide compounds, polyepoxide compounds and epoxide functional prepolymers. "Polyepoxide compound" refers to epoxide compounds having at least two epoxy groups. "Diepoxide compound" refers to epoxide compounds having two epoxy groups.

"Oligomer" as used herein refers to relatively low molecular weight polymeric compounds which include at least two monomer units linked to each other. Desirably the oligomer includes from 2 to 25,000 monomer units, desirably 2 to 1000 monomer units linked to each other, and more desirably 10 to 300 monomer units linked to each other. An oligomer is a subset of the term polymer. "Polymer" refers to any polymerized product greater in chain length and molecular weight than the oligomer.

"One or more", as used herein, relates to at least one and comprises 1, 2, 3, 4, 5, 6, 7, 8, 9 or more of the referenced species. Similarly, "at least one" means one or more, i.e. 1, 2, 3, 4, 5, 6, 7, 8, 9 or more. "At least one", as used herein in relation to any component, refers to the number of chemically different molecules, i.e. to the number of different types of the referenced species, but not to the total number of molecules. For example, "at least one polyol"

means that at least one type of molecule falling within the definition for a polyol is used but that also two or more different polyol types falling within this definition can be present but does not mean that only one type of said polyol is necessarily present.

Room temperature is about 23° C. plus or minus 2° C.

The disclosed compounds include any and all isomers and stereoisomers. In general, unless otherwise explicitly stated the disclosed materials and processes may be alternately formulated to comprise, consist of, or consist essentially of, any appropriate components, moieties or steps herein disclosed. The disclosed materials and processes may additionally, or alternatively, be formulated so as to be devoid, or substantially free, of any components, materials, ingredients, adjuvants, moieties, species and steps used in the prior art compositions or that are otherwise not necessary to the achievement of the function and/or objective of the present disclosure.

Unless explicitly indicated otherwise, all percentages that are cited in connection with the compositions described herein refer to weight percent (wt. %) with respect to final composition with all components.

In one embodiment the disclosed adhesive composition is a two component (2K) composition including a resin part and a hardener part. The resin part comprises a curable resin. The hardener part comprises a curative to initiate curing when mixed with the curable resin. Either or both parts can optionally comprise one or more of reactive diluent, non-reactive diluent, filler, release agent and additives.

Curable Resin

The curable resin is selected from a multifunctional, hydroxyl di-terminated polymer having alkene segments and epoxide segments in the polymer chain; an epoxy di-terminated block copolymer having siloxane moieties and bisphenol A moieties in the backbone and combinations thereof. The curable resin can have a molecular weight of about 100 to about 50,000, more typically about 500 to about 5000. Useful materials for the curable resin include PolyBD 600 and PolyBD 605E both available from Cray Valley USA, LLC and Albiflex materials available from Evonik Industries AG, Germany such as Albiflex 296, Albiflex 297 and Albiflex 348.

Most epoxy comprising resins have a bond strength too great to be used in this application, e.g. they will bond to the mold and part and cannot be removed or cannot be removed without the use of tools. This is true even when the formulation is modified to decrease bond strength overall.

Curative

The curative is a compound, or combination of different compounds, that, when mixed with the curable resin, will polymerize with the curable resin, or initiate homo-polymerization of that resin. A wide range of curatives can be used including polyfunctional amines, acids (and acid anhydrides), phenols, alcohols, thiols (usually called mercaptans) and combinations thereof.

Amines can be used as the curative. Primary amines undergo an addition reaction with the epoxide group to form a hydroxyl group and a secondary amine. The secondary amine can further react with an epoxide to form a tertiary amine and an additional hydroxyl group. Kinetic studies have shown the reactivity of the primary amine to be approximately double that of the secondary amine. Use of a difunctional or polyfunctional amine forms a three-dimensional cross-linked network. Tertiary amines, can be used alone as an curative; or as an accelerator in combination with polyamines, polyamides and/or amidoamines; or as a catalyst with thiols. Aliphatic, cycloaliphatic and aromatic amines are all employed as epoxy curatives. Overall reactivity potential for different amine curatives can roughly be ordered; aliphatic amines>cycloaliphatic amines>aromatic amines, though aliphatic amines with steric hindrance near the amino groups may react as slowly as some of the aromatic amines.

Anhydrides can be used as the curative. Reaction and subsequent crosslinking of the curable resin occurs after opening of the anhydride ring, e.g. by secondary hydroxyl groups in the epoxy resin. Homopolymerization may also occur between epoxide and hydroxyl groups. This class of curative is not preferred as the mixed composition requires exposure to sufficient heat to initiate reaction before the mold can be used.

Polyphenols, such as bisphenol A or novolacs can be used as the curative. These materials can react with epoxy resins at elevated temperatures, normally in the presence of a catalyst. This class of curative is not preferred as the mixed composition requires exposure to sufficient heat to initiate reaction before the mold can be used.

Thiols, also known as mercaptans, can be used as the curative. These materials contain a sulfur which reacts very readily with the epoxide group, even at ambient or sub-ambient temperatures.

Useful curatives include Capcure products such as Capcure 3-800 and Capcure 40 secHV from Gabriel US, Ancamine products available from Evonik Industries AG, Germany and Jeffamine products available from Huntsman U.S.

Reactive Diluent

The adhesive composition can optionally comprise an epoxy functional, low viscosity of about 2 to about 400 cP at 25° C., reactive diluent. The reactive diluent is crosslinked into the cured composition and therefore cannot migrate from the cured composition during subsequent layup of a part using the mold. Known reactive diluents include glycerol trigylcidyl ether, butyl glycidyl ether, cresyl glycidyl ether, 2-ethylhexyl glycidyl ether, alkyl ($C_8$-$C_{10}$) glycidyl ether, alkyl ($C_{12}$-$C_{14}$) glycidyl ether, neopentyl glycol diglycidyl ether, 1,4-butanediol diglycidyl ether, 1,4-cyclohexanedimethanol diglycidyl ether, alkyl ($C_{12}$-$C_{13}$) glycidyl ether, p-tertiary butyl phenol glycidyl ether, trimethylol propane triglycidyl ether, propylene glycol diglycidyl ether, neodecanoic acid glycidyl ester, resorcinol diglycidyl ether, long chain polyglycol diepoxide, shorter chain polyglycol diepoxide, aliphatic hydrocarbon reactive diluent, epoxidized ortho cresol, ortho-cresyl glycidyl ether, epoxidized para-tertiary butyl phenol, epoxidized phenol, trifunctional glycidyl amine type epoxy resin, phenyl glycidyl ether, cresyl glycidyl ether, p-tertiary butyl phenyl glycidyl ether, and combinations thereof.

Useful reactive diluents include the Epodil materials available from Evonik Industries AG, Germany such as Epodil 748 monofunctional aliphatic glycidyl ether, Epodil 762 trifunctional trimethylol propane triglycidyl ether and Epodil 733 trifunctional glycerol triglycidyl ether. The multifunctional epoxy materials can add tensile strength to the cured reaction products. However, they must be used judiciously to avoid adding unwanted strength to the blocking material, thereby making it difficult to remove from the mold and/or part and therefore unusable.

Since the reactive diluent includes reactive epoxy moieties it can only be used in the resin part. Adding reactive diluent to the hardener part will initiate a reaction between the reactive diluent and the curative.

Non-Reactive Diluent

The adhesive composition can optionally comprise a non-reactive diluent. The non-reactive diluent is fluid at room temperature and is essentially free of moieties that will react with other components of the composition. Useful classes of non-reactive diluents include, organic solvents, especially high boiling point solvents such as xylene and phthalates such as dibutyl phthalate.

Since this diluent is non-reactive it can be added to the resin part, the hardener part or both. In some embodiments the blocking material is essentially free or free of solvents.

Filler

The curable composition can optionally comprise filler. Some useful fillers include, for example, lithopone, zirconium silicate, hydroxides, such as hydroxides of calcium, aluminum, magnesium, iron and the like, diatomaceous earth, carbonates, such as sodium, potassium, calcium, and magnesium carbonates, coated calcium carbonate, oxides, such as zinc, magnesium, chromic, cerium, zirconium and aluminum oxides, calcium clay, nanosilica, fumed silicas, silicas that have been surface treated, for example with a silane or silazane such as the AEROSIL® products available from Evonik Industries, or with an acrylate or methacrylate such as AEROSIL® R7200 or R711 available from Evonik Industries, precipitated silicas, untreated silicas, graphite, synthetic fibers, organoclays such as Cloisite® nanoclay sold by Southern Clay Products, exfoliated graphite such as xGnP® graphene nanoplatelets sold by XG Sciences, zeolites, bentonites, alumina, sand, quartz, flint, mica, powdered glass and other ground minerals, carbon black, graphite, wood fibers, wood flour, sawdust, cellulose, cotton, pulp, wood chips, chopped straw, chaff, ground walnut shells, short fibers such as glass fibers, glass filament, polyacrylonitrile, carbon fibers, Kevlar fibers, polyethylene fibers. Also useful are hollow spheres with a mineral shell or a plastic shell are suitable as fillers. These can be e.g. hollow glass spheres which are commercially available with the trade names Glass Bubbles®. Plastic-based hollow spheres are commercially available, e.g. with the names Expancel® or Dualite®.

When used, the curable composition can include filler in amounts up to about 50% by weight of composition, more typically 1% to 12% by weight of composition. Filler can be added to the resin part, the hardener part or both.

Release Agent

The adhesive composition can optionally comprise release agent. Many release agents for mold applications are known and most can be used in this application. Some exemplary mold release agents include polyolefins, for example the Synfluid series from CP Chem; siloxanes, for example polyether modified polydialkylsiloxanes, for example BYK-333, BYK-378, BYK-P 9912 and BYK-P 9051 from BYK; waxes and modified waxes such as EBS (ethylene bissteramide) wax powder, for example S-400-Q, S-400-N1-G from Shamrock; and Mavcoat mold release agents available from Maverix Solution, Inc. Depending on compatibility, the release agent can be added to the resin part, the hardener part or both.

Additives:

The two-component adhesive composition can optionally contain one or more additives. Optional additives include catalyst or accelerator, thixotrope or rheology modifier, antioxidant, reaction modifier, thermoplastic polymer, adhesion promoter, coloring agent, solvent, tackifier, plasticizer, flame retardant, moisture scavenger, and combinations of any of the above, to produce desired functional characteristics, providing they do not significantly interfere with the desired properties of the curable composition or cured reaction products of the curable composition.

The curable adhesive compositions can optionally include a catalyst or accelerator to modify speed of the initiated reaction. Some suitable catalysts are those conventionally used in epoxy reactions and epoxy curing, including tertiary amines, for example tris-(dimethylaminomethyl) phenol, o-(dimethylaminomethyl) phenol; imidazoles; substituted urea etc. When used, the curable composition can include from about 0.1% to about 20% catalyst by weight of composition. Catalyst is typically added to the hardener part.

The curable composition can optionally include one or more coloring agents. For some applications a colored composition can be beneficial to allow for inspection of the applied composition. A coloring agent, for example a pigment or dye, can be used to provide a desired color beneficial to the intended application. Exemplary coloring agents include titanium dioxide, C.I. Pigment Blue 28, C.I. Pigment Yellow 53 and phthalocyanine blue BN. In some applications a fluorescent dye can be added to allow inspection of the applied composition under UV radiation. When used, the curable composition can include about 0.01% or more coloring agent by weight of total composition. The maximum amount is governed by considerations of cost and compatibility with the composition. Coloring agent can be added to the resin part, the hardener part or both.

The curable composition can optionally include solvent. The composition is preferably essentially free or free of water or aqueous solvent. In some embodiments the composition is essentially free or free of organic solvent. When used, the curable composition can include up to 80% solvent by weight of the curable composition. Solvent can be added to the resin part, the hardener part or both.

In one embodiment the resin part of the two component curable composition has the following composition. All percentages are approximate and in weight percent by weight of resin part.

| resin part A | | |
|---|---|---|
| component | range 1 | range 2 |
| curable resin | 40-100% | 50-100% |
| reactive diluent | 0-35% | 5-20% |
| non-reactive diluent | 0%-30% | 0%-15% |
| release agent | 0%-25% | 2%-18% |
| filler | 0%-50% | 0%-12% |
| additives | 0%-10% | 0%-10% |

Preferably the resin part includes reactive diluent to increase cohesiveness of the cured composition to make removal in large pieces easier. Preferably, the resin part includes non-reactive diluent or release agent. In some embodiments the resin part includes both the non-reactive diluent and the release agent. Typically, the part A components are added together, mixed to blend the components, and packaged. In this embodiment part A is a liquid having a viscosity of about 10000 cP to about 200000 cP at 25° C.

In one embodiment the hardener part of the two component curable composition has the following composition. All percentages are approximate and in weight percent by weight of part B.

| hardener part B | | |
|---|---|---|
| component | range 1 | range 2 |
| curative | 30-100% | 50-95% |
| non-reactive diluent | 0%-60% | 0%-30% |
| release agent | 0%-50% | 2%-40% |
| additives | 0%-10% | 0%-10% |
| filler | 0-50% | 0-10% |

Typically, the part B components are added together, mixed to blend the components, and packaged. In this embodiment part B is a liquid having a viscosity of about 10,000 cP to about 300,000 cP at 25° C.

In one embodiment the mixed curable composition has the following approximate properties.

| property | range 1 | range 2 |
|---|---|---|
| index[1] | 0.55-1.55 | 0.80-1.20 |
| viscosity, | 10000-280000 | 20000-150000 |
| open time (min) | 2-40 | 3-10 |
| gel time (min) | 1-30 | 4-15 |
| cure time | 2 hours-1 week | 4 hours-12 hours |

[1]Index is (number of epoxy groups/number of groups reacting with epoxy groups) × 100.

In one embodiment a cured reaction product of the mixed curable composition has some or all of the following approximate properties.

| property | range 1 | range 2 |
|---|---|---|
| room temp cure hardness (Shore A) | >10 | >20 |
| heat cure hardness (Shore A) | >30 | 60 to 80 |
| tensile strength (psi) | <1,000 | 100-800 |
| failure mode blocking material to mold | adhesive | adhesive |
| failure mode blocking material to cured part | adhesive | adhesive |

The tensile strength of less than or equal to 1,000 psi is substantially less than the 2,000 psi plus strength achieved by commercial epoxy adhesives. Commercial epoxy adhesives are too strong to be satisfactorily used as a mold blocking composition. However, the 1,000 psi maximum strength of the disclosed compositions would generally be unsuitable for use as structural adhesive.

In some embodiments a higher hardness is more desirable as it allows the cured mold blocking material to be removed more easily and with less crumbling or breaking into small pieces.

A mold can have a cut out into which layup of the part is sometimes desired. For example, a mold can have a recess defined in the surface. Molding material, for example layers of resin saturated reinforcing scrim are placed over the mold and pushed into the mold. This pushes the molding material into the recess. When the molded part is removed from the mold it will have a raised surface corresponding to the mold recess.

However, in some applications it may be desirable to produce a molded part with no raised surface. The resin part and the hardener part are packaged and stored in separate containers. Just before use a portion of the resin part and a portion of the hardener part are combined and mixed to homogeneity. Mixing the two parts initiates curing of the composition. To modify the mold the mixed composition is placed into the mold recess and cured. Layers of resin saturated reinforcing scrim are placed over the mold and pushed into the mold. The cured composition supports the layers and prevents the material from penetrating into the recess. After the molded part has cured it is removed from the mold. The molded part has a surface with no raised area.

The cured composition can be removed from the mold, typically by hand without powered tools or chemicals while leaving little or no residue on the mold.

The following examples are included for purposes of illustration so that the disclosure may be more readily understood and are in no way intended to limit the scope of the disclosure unless otherwise specifically indicated.

The proceeding description is meant to be exemplary and it is to be understood that variations and modifications may be employed without departing from the concept and intent of the invention as defined in the following claims.

Measurement of Mixed Composition Gel Time

The mixed composition gel time was measured by putting 15 grams of well mixed mixture of resin part A and hardener part B in a 1 oz jar. The mixture was probed with a wood stick at 1 minute intervals. The time when there is no transfer of mixed composition to the wooden stick, is recorded as the gel time.

Measurement of Resin Part Stability

The resin part composition was thoroughly mixed. 20 grams of resin was put in 30 ml glass vial, maintained at room temperature and visually monitored a regular basis. Stability was the first time at which the test period ended or liquid separation or phase separation was observed. A resin stability of less than 4 days can be problematic for some applications. A resin stability of 4 days or more is desirable.

Measurement of Shore Hardness

For a room temperature cure hardness, samples are prepared and cured at room temperature for 24 hours. The hardness test procedure is carried out in accordance with ASTM D2240. For a heat cured hardness, samples are prepared, cured at room temperature for 24 hours, subsequently heated in an oven set at 350° F. for 2 hours and cooled to room temperature. The hardness test procedure is carried out in accordance with ASTM D2240.

Measurement of Viscosity

Viscosity was tested using a Physica MCR 301 rheometer with a PP25 cone at 10 s-1 and 25° C.

Measurement of Tensile Strength Using Lap Shear Test

Compositions were mixed as described. The lap shear sample preparation and testing were based on ASTM D1002-05 or ASTM D3163. The lap shear substrate is a glass fiber reinforced epoxy substrate available as Epoxy FR-4 or G-10 Epoxy Glass from Curbell Plastics. Each substrate has a dimension is about 4 inches×1 inch×0.06 inches. The substrates were cleaned to remove dirt and oils. Adhesive was applied to a portion of one surface of a substrate. Spacers were disposed on the substrate surface to induce a 10 mil (0.010 inch) gap. 10 mil glass beads or wires were used as spacers. A second substrate surface was disposed over the adhesive and clamped to form a 1.0 inch×0.5 inch×10 mil thick bonding area. The clamped samples were cured by holding at room temperature and conditions for about 24 hours.

The lap shear samples were tested at pulling speed 0.08 inch/minute, the tensile strength at maximum load was recorded. The provided strengths for each composition are an average of results for multiple lap shear specimens.

Failure Mode was checked after the bonded specimens were pulled apart. If the adhesive remained bonded to the specimens but the specimen failed outside the bonded area the failure modes was identified as "substrate failure". If the adhesive was observed to adhere to all of the bonded area on both substrates, the failure mode was identified as "cohesive failure" or "cohesion failure". If the adhesive was identified to have released from all of the bonded area on at least one of the substrates the failure mode was identified as "adhesive failure" or "adhesion failure". If the adhesive remained bonded to some, but not all, of the bonded area the failure mode was identified as a mixed adhesive/cohesive failure. Results are reported as S (failure of substrate only); A (adhesive failure), C (cohesive failure mode) or a combination of these failure modes.

It is desirable for the cured blocking material to have an adhesive failure mode to the mold and cured part. It is desirable for the cured blocking material to have enough strength to support the mold material during the molding operation and enough cohesive strength so that the cured blocking material does not disintegrate or crumble during removal from the mold.

Example 1

A two-component commercial epoxy composition (A commercial) and that commercial epoxy composition with added plasticizer to decrease strength (B modified commercial) were compared to one embodiment of the disclosed two component adhesive composition. Compositions are shown below. All amounts are by weight of the respective resin part or hardener part. The resin part and the hardener part were mixed as recommended (commercial material) or to provide an index of about 1.0.

| part | component | A commercial | B modified commercial | 1 |
|---|---|---|---|---|
| resin | curable resin | E20HP[1] | 85 E20HP[1] | 59.5[2] |
| resin | plasticizer[3] | 0 | 15 | 0 |
| resin | trifunctional reactive diluent | 0 | 0 | 25.5[4] |
| resin | non-reactive diluent | 0 | 0 | 15[5] |
| | total (wt. %) | 100 | 100 | 100 |
| hardener | | E20HP[6] | E20HP[6] | 0 |
| hardener | curative | 0 | 0 | 50[7] |
| hardener | curative | 0 | 0 | 50[8] |
| | total (wt. %) | 100 | 100 | 100 |
| | index (epoxy/hardener) | 1.0 | 1.0 | 1.0 |
| | lap shear strength (psi) | 3783 | 1915 | 178 |
| | Lap shear failure mold | S | A/C | A/C |

[1]E20HP resin part. This is one part of a 2K epoxy adhesive available from Henkel Corporation, U.S.
[2]Albiflex 297 available from Evonik Corporation, U.S.
[3]Jayflex DIDP available from ExxonMobil
[4]Epodil 733 available from Evonik Corporation, U.S.
[5]Synfluid 7 PAO available from Chevron Phillips Chemical Company LP, U.S.
[6]E20HP hardener part. This is one part of a 2K epoxy adhesive available from Henkel Corporation, U.S.
[7]Capcure 3-800 available from Huntsman, U.S.
[8]40 sec HV available from Huntsman, U.S.

Example 2

Commercial epoxy adhesive A has a high lap shear strength as would be expected of a structural adhesive. However, commercial epoxy adhesive A is not suited for use as mold blocking material as blocking material as it bonds so strongly to the mold that it is difficult or impossible to remove from the mold after curing. To reduce bond strength commercial adhesive A was modified by adding plasticizer to make modified commercial adhesive B. While this reduced bond strength of the modified adhesive the 1915 psi strength was still too high for use as mold blocking material.

Example 2

Different embodiments of the disclosed two component adhesive composition were compared to a two-component commercial epoxy composition modified by addition of plasticizer. Compositions are shown below. All amounts are by weight of the respective resin part or hardener part. The resin part and the hardener part were mixed as recommended (commercial material) or to provide an index of about 1.0.

| part | component | B modified commercial | 1 | 2 | 3 |
|---|---|---|---|---|---|
| resin | curable resin | 85[1] | 59.5[2] | 100[2] | 85.0[2] |
| resin | plasticizer[3] | 15 | 0 | 0 | 0 |
| resin | reactive diluent[4] | 0 | 25.5 | 0 | |
| resin | non-reactive diluent[5] | 0 | 15 | 0 | 15 |
| | total (wt. %) | 100 | 100 | 100 | 100 |
| hardener | | E20HP[6] | 0 | 0 | 0 |
| hardener | mercaptan polymer[7] | 0 | 50 | 50 | 50 |
| hardener | mercaptan[8] | 0 | 50 | 50 | 50 |
| | total (wt. %) | 100 | 100 | 100 | 100 |
| | index (epoxy/hardener) | 1.0 | 1.0 | 1.0 | 1.0 |
| | lap shear strength (psi) | 1915 | 178 | 372 | 238 |
| | Lap shear failure mode | A/C | A/C | A/C | A/C |
| | room temp Hardness (Shore) | 55 (D) | 23 (A) | 35 (A) | 28 (A) |
| | heated Hardness (Shore) | NT[9] | 43 (A) | NT[9] | 34 (A) |

[1]E20HP resin part. This is one part of a 2K epoxy adhesive available from Henkel Corporation, U.S.
[2]Albiflex 297 available from Evonik Corporation, U.S.
[3]Jayflex DIDP available from ExxonMobil
[4]Epodil 733 available from Evonik Corporation, U.S.
[5]Synfluid 7 PAO available from Chevron Phillips Chemical Company LP, U.S.
[6]E20HP hardener part. This is one part of a 2K epoxy adhesive available from Henkel Corporation, U.S.
[7]Capcure 3-800 available from Huntsman, U.S.
[8]40 sec HV available from Huntsman, U.S.
[9]not tested Modified commercial epoxy adhesive B has a high lap shear strength and is not suited for use as mold blocking material as blocking material as it bonds so strongly to the mold that it is difficult or impossible to remove from the mold after curing.

Example 3

Different embodiments of the disclosed two component adhesive composition were prepared using different curable resins. Compositions are shown below. All amounts are by weight of the respective resin part or hardener part. The resin part and the hardener part were mixed as recommended (commercial material) or to provide an index of about 1.0.

| part | component | 1 | 4 | 5 | 6 | 7 |
|---|---|---|---|---|---|---|
| resin | curable resin[1] | 59.5% | 0 | 0 | 0 | 0 |
| resin | curable resin[2] | 0 | 59.5 | 0 | 59.5 | 0 |
| resin | curable resin[3] | 0 | 0 | 59.5 | 0 | 59.5 |
| resin | trifunctional reactive diluent[4] | 25.5 | 25.5 | 25.5 | 25.5 | 25.5 |
| resin | non-reactive diluent[5] | 15 | 0 | 0 | 15 | 15 |
| resin | non-reactive diluent[6] | 0 | 15 | 15 | 0 | 0 |
| | total (wt. %) | 100 | 100 | 100 | 100 | 100 |
| hardener | mercaptan polymer[7] | 50 | 50 | 50 | 50 | 50 |
| hardener | mercaptan[8] | 50 | 50 | 50 | 50 | 50 |
| | total (wt. %) | 100 | 100 | 100 | 100 | 100 |
| | index (epoxy/hardener) | 1.0 | 1.0 | 1.0 | 1.0 | 1.0 |
| | resin stability | stable | <2 days | Stable >4 days | <1 day | Stable >4 days |
| | lap shear strength (psi) | 178 | NT[9] | 0.5 | NT[9] | 16 |
| | Lap shear failure mode | A/C | NT[9] | C | NT[9] | C |

[1]Albiflex 297 available from Evonik Corporation, U.S.
[2]Epon 828 difunctional bisphenol A/epichlorohydrin derived liquid epoxy resin available from Hexion
[3]Poly BD 605E available from Cray Valley, U.S.
[4]Epodil 733 available from Evonik Corporation, U.S.
[5]Synfluid 7 PAO available from Chevron Phillips Chemical Company LP, U.S.
[6]Synfluid 2 PAO available from Chevron Phillips Chemical Company LP, U.S.
[7]Capcure 3-800 available from Huntsman, U.S.
[8]40 sec HV available from Huntsman, U.S.
[9]NT is not tested due to stability test failure Samples prepared using EPON 820 were not compatible with the non-reactive diluents, leading to undesirable separation of the resin part. Samples prepared using Poly BD 605E as the curable resin were stable and had low strengths. While these low strengths were not suited for use as a structural adhesive they were desirable for use as a mold blocking material.

Example 4

Different embodiments of the disclosed two component adhesive composition were prepared using different curable resins. Compositions are shown below. Sample 1a is the same formulation as sample 1 but separately made and tested at a different time from Sample 1. All amounts are by weight of the respective resin part or hardener part. The resin part and the hardener part were mixed as recommended (commercial material) or to provide an index of about 1.0.

| part | component | 1a | 8 | 9 | 10 |
|---|---|---|---|---|---|
| resin | curable resin[1] | 59.5 | 59.5 | 66.5 | 52.5 |
| resin | trifunctional reactive diluent[2] | 25.5 | 25.5 | 28.5 | 22.5 |
| resin | non-reactive diluent[3] | 15 | 0 | 5 | 25 |
| resin | non-reactive diluent[4] | 0 | 15 | 0 | 0 |
| | total | 100 | 100 | 100 | 100 |
| hardener | mercaptan polymer[5] | 50 | 50 | 50 | 50 |
| hardener | mercaptan[6] | 50 | 50 | 50 | 50 |
| | total | | | | |
| | index (epoxy/hardener) | 1.0 | 1.0 | 1.0 | 1.0 |
| | resin stability (days) | Stable >4 days | Stable >4 days | Stable >4 days | Stable >4 days <1 week |

-continued

| part | component | 1a | 8 | 9 | 10 |
|---|---|---|---|---|---|
| | lap shear strength (psi) | 132 | 265 | 240 | NT[7] |
| | Lap shear failure mode | A/C | A/C | A/C | NT |

[1]Albiflex 297 (Albiflex 297) available from Evonik Corporation, U.S.
[2]Epodil 733 available from Evonik Corporation, U.S.
[3]Synfluid 7 PAO available from Chevron Phillips Chemical Company LP, U.S.
[4]Synfluid 9 PAO available from Chevron Phillips Chemical Company LP, U.S.
[5]Capcure 3-800 available from Huntsman, U.S.
[6]Capcure 40 sec HV available from Huntsman, U.S.
[7]NT is not tested due to stability test failure The PAO non-reactive diluent retains its ability to decrease adhesion of the cured adhesive to a substrate even at concentrations of 5 wt. % of the resin part or below. PAO non-reactive diluent concentrations of about 25% lead to undesirable instability of the resin part in this embodiment.

Example 5

The resin part of sample 1 was combined with different hardener compositions. Compositions are shown below. All amounts are by weight of the respective resin part or hardener part. The resin part and the hardener part were mixed as recommended (commercial material) or to provide an index of about 1.0.

| part | component | 1a | 11 | 12 | 13 | 14 |
|---|---|---|---|---|---|---|
| resin | curable resin[1] | 59.5 | 59.5 | 59.5 | 59.5 | 59.5 |
| resin | trifunctional reactive diluent[2] | 25.5 | 25.5 | 25.5 | 25.5 | 25.5 |
| resin | non-reactive diluent[3] | 15 | 15 | 15 | 15 | 15 |
| | total (wt. %) | 100 | 100 | 100 | 100 | 100 |
| hardener | mercaptan polymer[4] | 50 | 0 | 0 | 90 | 0 |
| hardener | mercaptan[5] | 50 | 0 | 0 | 0 | 100 |
| | modified polyamine[6] | 0 | 100 | 0 | 0 | 0 |

-continued

| part | component | 1a | 11 | 12 | 13 | 14 |
|---|---|---|---|---|---|---|
| | modified aliphatic amine[7] | 0 | 0 | 100 | 0 | 0 |
| | tertiary amine[8] | 0 | 0 | 0 | 10 | 0 |
| | total (wt. %) | 100 | 100 | 100 | 100 | 100 |
| | index (epoxy/hardener) | 1.0 | 1.0 | 1.0 | 1.0 | 1.0 |
| | gel time (min) | 3 | 25 | 20 | 6 | 5 |
| | lap shear strength (psi) | 132 | 330 | 790 | 213 | 382 |
| | Lap shear failure mode | A/C | A/C | C | A/C | A/C |

[1]Albiflex 297(Albiflex 297) available from Evonik Corporation, U.S.
[2]Epodil 733 available from Evonik Corporation, U.S.
[3]Synfluid 7 PAO available from Chevron Phillips Chemical Company LP, U.S.
[4]Capcure 3-800 available from Huntsman, U.S.
[5]Capcure 40 sec HV available from Huntsman, U.S.
[6]Ancamine 2803 available from Evonik Corporation, U.S.
[7]Ancamine 2914UF available from Evonik Corporation, U.S.
[8]Ancamine K54 available from Evonik Corporation, U.S.

This Example shows that a plurality of hardeners are useful in the adhesive composition and gel time of the mixed composition can be adjusted by varying the hardener. Hardener composition will have an effect on adhesion strength of the cured composition, however the adhesion strengths were all too low for use as a conventional epoxy adhesive.

Example 6

Reactive diluent concentrations and types were varied in the resin part. Compositions are shown below. All amounts are by weight of the respective resin part or hardener part. The resin part and the hardener part were mixed as recommended (commercial material) or to provide an index of about 1.0.

| part | component | 1a | 15 | 16 | 17 |
|---|---|---|---|---|---|
| resin | curable resin[1] | 59.5 | 59.5 | 25.5 | 40 |
| resin | tri-functional reactive diluent[2] | 25.5 | 0 | 59.5 | 45 |
| resin | monofunctional reactive diluent[3] | 0 | 25.5 | 0 | 0 |
| part | component | 1a | 15 | 16 | 17 |
| resin | non-reactive diluent[4] | 15 | 15 | 15 | 15 |
| | total wt. % | 100 | 100 | 100 | 100 |
| hardener | mercaptan polymer[5] | 50 | 50 | 50 | 50 |
| hardener | mercaptan[6] | 50 | 50 | 50 | 50 |
| | modified polyamine[6] | 0 | 0 | 0 | 0 |
| | total wt. % | 100 | 100 | 100 | 100 |
| | index (epoxy/hardener) | 1.0 | 1.0 | 1.0 | 1.0 |
| | resin stability (days) | >4 | <4 | <4 | <4 |
| | gel time (min) | 3 | NT[7] | NT[7] | NT[7] |
| | lap shear strength (psi) | 132 | NT[7] | NT[7] | NT[7] |
| | Lap shear failure mode | A/C | NT[7] | NT[7] | NT[7] |

[1]Albiflex 297 available from Evonik Corporation, U.S.
[2]Epodil 733 available from Evonik Corporation, U.S.
[3]Epodil 748 available from Evonik Corporation, U.S.
[4]Synfluid 7 PAO available from Chevron Phillips Chemical Company LP, U.S.
[5]Capcure 3-800 available from Huntsman, U.S.
[6]40 sec HV available from Huntsman, U.S.
[7]NT is not tested The trifunctional reactive diluent adds to the cross-link density of the cured composition which has a beneficial effect on elevated temperature properties of the cured composition such as compression strength. However, increasing concentration of the trifunctional reactive diluent can negatively effect stability of the resin part. Monofunctional reactive diluents can also be used, but do not provide additional cross linking or elevated temperature properties. Resin part stability may also be a problem at higher concentrations of monofunctional reactive diluent.

What is claimed is:

1. A curable, two component, mold blocking material, including:
   a resin part comprising,
      a curable resin selected from multifunctional, hydroxyl di-terminated polymer having alkene segments and epoxide segments in the polymer chain; an epoxy di-terminated block copolymer having siloxane moieties and bisphenol A moieties in the backbone and combinations thereof;
      optionally a reactive diluent, a non-reactive diluent, a release agent, a filler, an additive or a combination thereof;
   a hardener part comprising,
      at least one curative;
      optionally a non-reactive diluent, a release agent, filler, an additive or a combination thereof;
      wherein cured reaction products of the mixed mold blocking material have an adhesion strength of less than or equal to 1,000 psi when tested using a lap shear test and the lap shear test sample exhibits at least some adhesive failure.

2. The mold blocking material of claim 1 wherein the resin part comprises at least one of the non-reactive diluent or the release agent.

3. The mold blocking material of claim 1 comprising both up to 25 wt. % release agent and up to 30 wt. % non-reactive diluent in the resin part, in each case by weight of the resin part.

4. The mold blocking material of claim 1 having no material comprising a backbone with more than 15 mole % of an aryl moiety.

5. The mold blocking material of claim 1 having no material comprising a backbone with more than 15 mole % of bisphenol A moieties.

6. The mold blocking material of claim 1 wherein non-reactive diluent is present in the resin part in an amount of up to 30 wt. % of non-reactive diluent by weight of the resin part.

7. The mold blocking material of claim 1 further comprising release agent in the resin part or the hardener part.

8. The mold blocking material of claim 1 wherein the mixed mold blocking material has an open time of 2 to 40 minutes; and/or a gel time of 1 to 30 minutes; and/or a room temperature cure time of 2 to 12 hours.

9. Cured reaction products of the mixed mold blocking material of claim 1 having a tensile strength of less than 1,000 psi.

10. Cured reaction products of the mixed mold blocking material of claim 1 having a room temperature cure hardness of greater than 10 Shore A.

11. Cured reaction products of the mixed mold blocking material of claim 1 having a heat cure hardness of greater than 30 Shore A.

* * * * *